July 15, 1958  A. E. R. ARNOT ET AL  2,843,141

METERING DEVICES FOR HYDRAULIC CIRCUITS

Filed Nov. 21, 1955

INVENTORS
Alfred E. R. Arnot
Arthur H. Van Hooydonk
By
Martin Kirkpatrick
ATTORNEY United States Patent Office 2,843,141
Patented July 15, 1958

2,843,141

METERING DEVICES FOR HYDRAULIC CIRCUITS

Alfred Erwin Reginald Arnot and Arthur Hubert van Hooydonk, Basingstoke, England, assignors to John Reginald Sharp and Emmanuel Kaye, both of Basingstoke, England Application November 21, 1955, Serial No. 548,199

Claims priority, application Great Britain November 22, 1954

3 Claims. (Cl. 137—115)

This invention comprises improvements in or relating to metering devices for hydraulic circuits.

It is an object of the invention to provide a device which will maintain a constant rate of flow of hydraulic fluid under conditions of variable pressure supply.

According to the present invention a control valve for metering hydraulic fluid comprises in combination a valve body, a piston valve chamber therein, a piston valve sliding in the chamber, a spring to urge the valve in one direction, an inlet for hydraulic fluid under pressure on the opposite side of the piston valve from the spring, a port leading to drain which is opened by the piston valve under a predetermined pressure difference compressing the spring, and a fluid passage of limited effective area from one side of the piston valve to the other and thence to an outlet.

With a valve constructed as just described, the pressure difference on opposite sides of the piston valve will be maintained substantially constant because any increase of pressure difference which is dependent solely on rate of flow through the passage will move the valve further against the spring and increase the outlet to drain. Consequently, the flow from one side of the valve to the other will be carried out under a constant pressure difference and will be constant in amount. Means may be provided for varying this flow, if desired, by means of a needle or like valve for varying the effective area of the passage from one side of the piston valve to the other or by adjustment of the balancing spring force.

The following is a description, by way of example, of certain specific constructions of control valve in accordance with the invention:

In the accompanying drawing.

Figure 1:
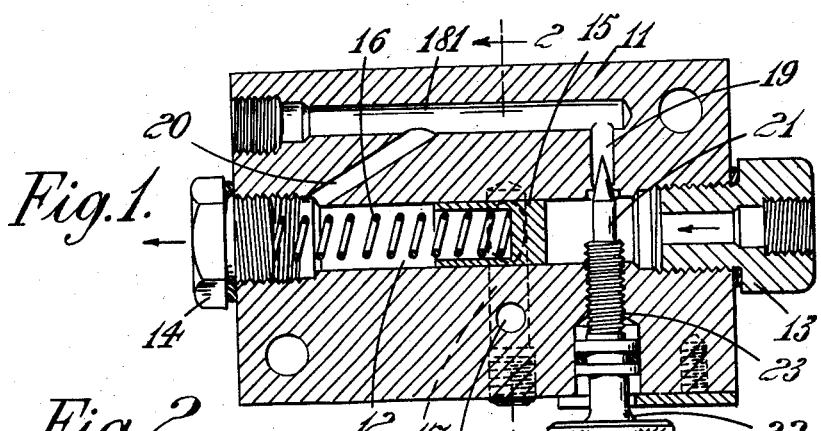
Figure 1 is a longitudinal section through one form of control valve.
Figure 2:
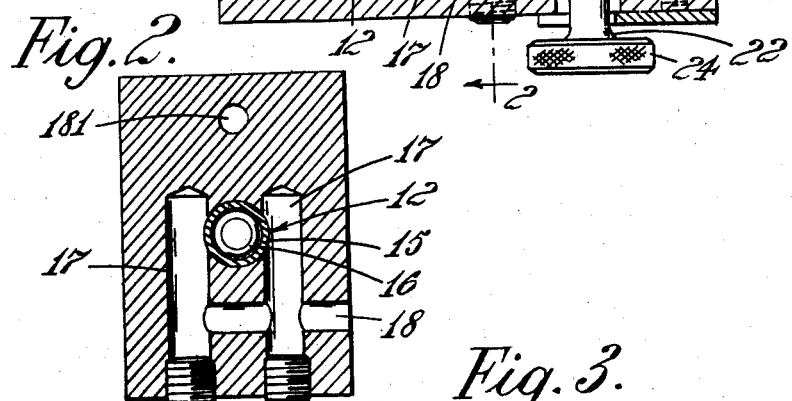
Figure 2 is a section upon the line 2—2 of Figure 1.

In the construction shown in Figure 1, a valve body 11 contains a piston valve bore 12 which extends through it from end to end and is closed at the ends by union connections 13, 14 for inlet and outlet pipes respectively.

Between the two union connections within the valve bore is a piston valve 15 having a spring 16 which urges it towards the inlet end of the bore 12. The piston valve-spring 16 has a certain initial compression, the amount of which determines the point at which the valve begins to move under pressure. The pressure difference required for this purpose need not be very high and therefore the spring need not be very strong, but it should be strong enough to ensure that the effect of friction is negligible. A pair of ports 17 one either side of the valve bore 12 are set in such a postion that they will open after the piston valve 15 has moved a short distance, and are connected by a cross-bore 18 to drain. The ports 17 should be of such size as to be capable of passing the variable fluid supply, or a substantial proportion thereof, when fully opened, and the increase in pressure of the spring 16 between the positions in which the ports are closed and in which the ports are fully opened should be small.

Also in the valve body 11, to one side of the valve bore 12 there is a fluid passage 181 which connects a port 19 at the inlet end of the valve bore with a port 20 at the other. The entrance to the port 19 is provided with a seating for a needle valve 21 and a needle valve stem 22 extends towards the seating and is operated by a screw thread 23 in the valve body and an appropriate external knurled head 24. The rate of flow of liquid through the valve will depend upon the opening to which the needle valve 21 is set and will be constant notwithstanding variations of supply pressure, down to the limit at which the supply delivery rate falls to a point at which the piston valve just closes the drain ports 17.

Figure 3:
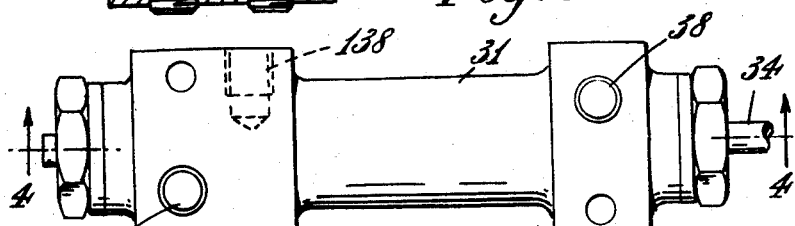
Figure 3 is a plan of a second form.
Figure 4:
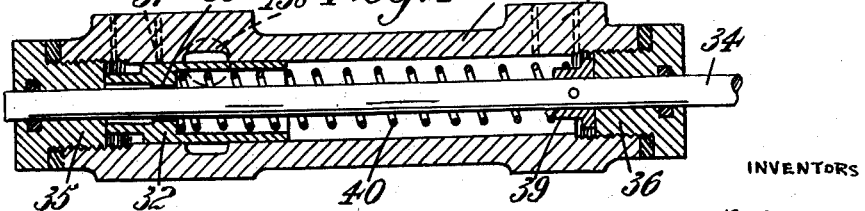
Figure 4 is a longitudinal section, taken upon the line 4—4 of Figure 3 looking in the direction of the arrows.

In the modified construction shown in Figures 3 and 4, instead of a passage such as 181 leading through valve body 31 around the piston valve 32 as a by-pass, there is an aperture 33 through the piston valve itself. This aperture is formed in the construction shown by a slight annular space between the valve 32 and a metering rod 34 which passes through it from end to end and through the centre of bushes 35, 36 which close the end of the valve bore. In this case the inlet to the valve bore is a lateral inlet 37 on one side of the piston valve and the outlet is a lateral one 38 at the other end of the bore. A drain port 138 is located intermediately and the place of the needle valve in the first construction is taken by the annular area 33 afforded between the central metering rod 34 and the bore surrounding it in the piston valve 32. The central metering rod 34 is made with a fixed collar 39 to bear on the end of the spring 40. Adjustment of the rate of flow can be effected by moving the metering rod 34 lengthwise in a direction to the left as shown in Fig. 4, and so varying the spring-pressure and thus the pressure difference at which the outlet 138 to drain will open.

An alternative method of regulating the rate of flow would be to provide a long taper on the metering rod 34 where it passes through the piston valve. Instead of a compression spring such as 40, acting on the piston valve, there might be a tension spring on the other side.

We claim:

1. A control valve for metering hydraulic fluid comprising in combination a valve body, a cylindrical piston valve chamber therein, a cylindrical piston valve sliding in the chamber, a spring to urge the valve in one direction, an inlet to said chamber for hydraulic fluid under pressure in opposition to said spring and positioned on one side of said valve, an outlet from said chamber on the opposite side of said valve, a port in the side wall of the piston valve chamber leading to a drain which is progressively opened by the piston valve under a predetermined pressure differential between said inlet pressure and the spring, an axial fluid passage of limited effective area leading through said piston valve from one side of the piston valve to the other and thence directly to said outlet, and a metering rod extending axially through said passage of limited effective area.

2. A control valve as claimed in claim 1 wherein said metering rod is tapered for varying the effective area of the passage from one side of the piston valve to the other for the purpose described.

3. A control valve as claimed in claim 1 further including a collar on said metering rod for varying the balancing spring force on the piston valve to vary the effective rate of flow.

References Cited in the file of this patent

UNITED STATES PATENTS

| | | |
|---|---|---|
| 1,467,522 | Amsler | Sept. 11, 1923 |
| 1,787,686 | Kerr | Jan. 6, 1931 |
| 1,804,751 | Doble | May 12, 1931 |

FOREIGN PATENTS

| | | |
|---|---|---|
| 136,455 | Sweden | July 8, 1952 |